United States Patent [19]
Blazek

[11] 3,770,615
[45] Nov. 6, 1973

[54] FLUID CATALYTIC CRACKING PROCESS WITH ADDITION OF MOLECULAR SIEVE CATALYST-LIQUID MIXTURE

[75] Inventor: James J. Blazek, Reisterstown, Md.
[73] Assignee: W. R. Grace & Co., New York, N.Y.
[22] Filed: Oct. 22, 1971
[21] Appl. No.: 191,729

[52] U.S. Cl.............................. 208/120, 208/164
[51] Int. Cl............................................ C10g 11/02
[58] Field of Search........................... 208/120, 164; 252/418

[56] References Cited
UNITED STATES PATENTS
3,294,675  12/1966  Adams et al..................... 208/152
3,295,897  1/1967  Erickson et al..................... 302/66

Primary Examiner—Delbert E. Gantz
Assistant Examiner—S. Berger
Attorney—Arthur P. Savage

[57] ABSTRACT

A process for catalytic cracking of hydrocarbons wherein fluidized molecular sieve catalyst is subjected to a heat treatment procedure, such as steaming, coincidentally upon addition to an existing cat-cracker catalyst inventory. A mixture of fluidized rare-earth-hydrogen Y catalyst and water or water-liquid hydrocarbon mixture, is injected directly into an existing hot (800°–1400°F.) fluid catalyst inventory whereupon heat treatment of the catalyst takes place within the cat-cracker unit.

10 Claims, 1 Drawing Figure

PATENTED NOV 6 1973
3,770,615
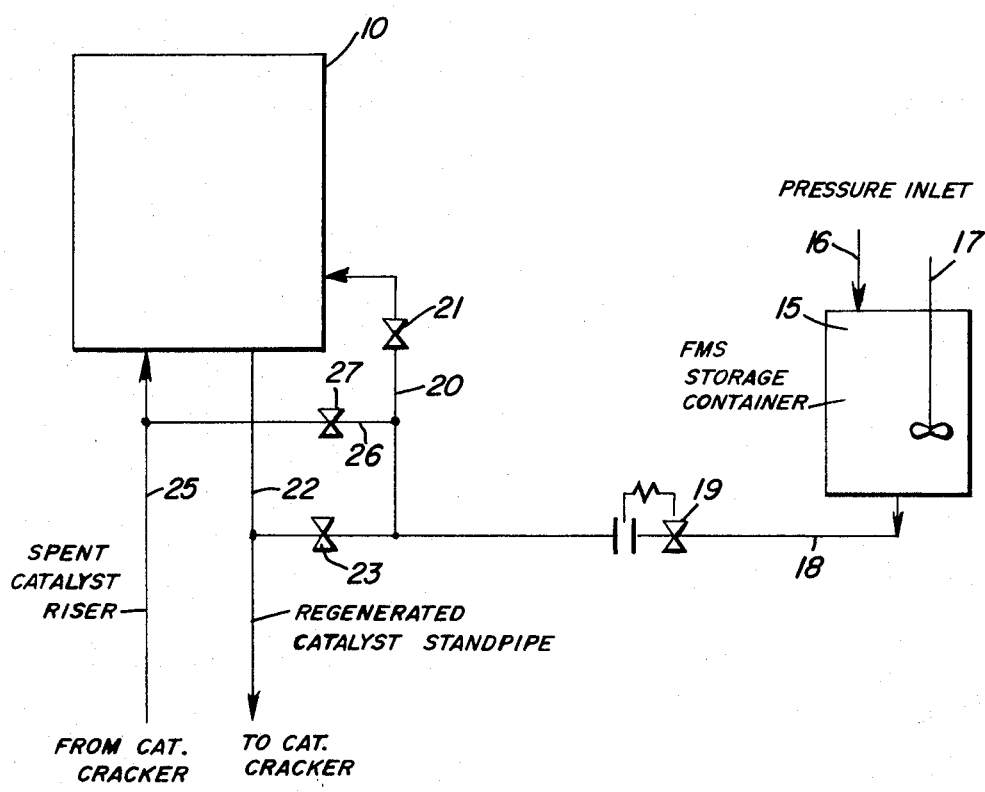
James J. Blazek
INVENTOR

FLUID CATALYTIC CRACKING PROCESS WITH ADDITION OF MOLECULAR SIEVE CATALYST-LIQUID MIXTURE

The present invention relates to the catalytic cracking of hydrocarbons, and more particularly to an improved method for preparing fluidizable molecular sieve (FMS) catalyst for use in a catalytic cracking unit.

In a previously filed application Ser. No. 187,823, filed Oct. 8, 1971, it is disclosed that fluidized molecular sieve catalysts (FMS) such as rare earth hydrogen Y, may be used either alone or in physical admixture with amorphous catalysts as a catalyst for the catalytic cracking of hydrocarbons. A convenient method for using FMS involves adding the highly active FMS catalyst to an existing catalyst inventory of a conventional fluid cat-cracker unit.

In many instances it is found that the catalytic performance of certain FMS type catalysts may be substantially improved by subjecting the FMS catalyst to a heat treatment procedure prior to use. This heat treatment involves heating the FMS catalyst in a steam or steam-gaseous hydrocarbon atmosphere at a temperature of from about 1,000° to 1,600°F. for a period of about 5 to 60 minutes.

It is frequently found that heat treatment of large commercial quantities of FMS catalyst at their point of manufacture represents an expensive, time consuming procedure.

It is therefore an object of the present invention to provide an improved method for heat treating FMS catalyst used in the cat-cracking of hydrocarbons.

It is a further object to provide a method whereby heat treatment of FMS catalyst may be performed coincidentally with addition of the catalyst to a commercial cat-cracking unit.

These and still further objects of the present invention will become readily apparent to one skilled in the art from the following detailed description and drawing which depicts in schematic form a typical system which may be utilized for the addition of the FMS catalyst to the existing catalyst inventory of a conventional cat-cracking unit.

Broadly, my invention contemplates a procedure whereby a mixture of water or water-hydrocarbon mixture and essentially fresh, i.e. non-heat treated FMS catalyst, is added to a hot catalyst inventory associated with a catalytic cracking unit.

More specifically, I have found that fresh FMS catalyst may be conveniently and economically heat treated prior to use by a procedure wherein a mixture of FMS and fluid water or water-hydrocarbon is added at any point to an existing catalyst inventory of a commercial cracking unit wherein the existing catalyst possesses a temperature of from about 800° to 1,400°F. The heated catalyst inventory will possess sufficient heat to convert the fluid water or water-hydrocarbon to a high temperature steam and/or burning gases and thereby produce a heat treatment atmosphere in and around each individual catalyst particle suitable for treating the FMS catalyst within the confines of the cat-cracking unit. This procedure obviates the need for a separate heat treatment procedure.

A more complete understanding of my novel procedure can be obtained by reference to the following drawing wherein the figure represents in schematic form the regeneration portion of a typical petroleum cat-cracking unit associated with the apparatus necessary for injecting a mixture of FMS catalyst and heat treatment fluid, i.e. water or water-liquid hydrocarbon, into a heated portion thereof.

More specifically, cat-cracker regeneration vessel 10 which is maintained at a temperature of about 1,100° to 1,300°F. for purposes of regenerating, i.e. oxidizing and thereby removing the coke from a spent catalyst, is connected to a FMS slurry catalyst storage container 15 by way of a series of conduits described later. The FMS storage container 15 possesses a pressure catalyst fluid inlet 16 and an agitator means 17 which maintains a uniform dispersion, I.E. slurry of FMS in fluid. Leading from the FMS storage container 15 is a conduit 18 the flow through which is controlled by valve means 19. The conduit 18 branches subsequent to the valve 19 into conduit 20 which leads to the regeneration vessel 10. The flow through conduit 20 is regulated by means of a valve 21. Leading from the catalyst regenerator vessel is a catalyst standpipe 22 which conveys regenerated catalyst from the regenerator to a cat-cracker which is not shown in the present drawing. The regenerated catayst standpipe 22 is also connected to the FMS conduit 18 and flow thereto from conduit 18 is regulated by valve 23.

A spent catalyst riser pipe from a cat-cracker unit (not shown) leads to the regeneration vessel 10. A branch of conduit 18, 26 is interconnected to the spent catalyst riser pipe 25 and flow through branch 26 is controlled by valve 27.

In operation it is contemplated that a slurry of fluid and FMS sieve from the storage container 15 may be injected at any point in the regenerator vessel piping shown in the figure. For example, an FMS slurry may pass through conduit 18 directly into the regenerator vessel by way of branch 20 as regulated by valve 21. Furthermore, if it is desired to add the FMS slurry to the spent catalyst riser pipe 25, valve 21 and 23 may be closed whereupon opening of valve 27 permits the passage of the FMS slurry through branch 26 into the catalyst riser pipe 25.

Still further, if it is desired to add the FMS-fluid slurry to the regenerated catalyst standpipe 22, valves 21 and 27 may be opened whereupon opening of valve 23 permits the flow of FMS-fluid slurry to the regenerated catalyst standpipe 22. The amount of FMS slurry passing to any point in the catalyst regeneration system is preferably controlled by a proportioning valve 19. It is contemplated that the FMS slurry may be added at any one point in the catalyst regeneration system, or alternatively the FMS slurry may be added at any combination or all of the points indicated in the diagram.

The precise points at which the FMS slurry is added will to a large extent depend upon the preference of the operator and upon the conditions of temperature existing at the various points in the regenerator system. Furthermore, the point at which the FMS slurry is added will depend upon the length of steaming required for the catalyst prior to exposure to catalytic conversion conditions in the cat-cracker. For example, if the FMS slurry is added to the spent catalyst riser 25 the mixture must pass through the regenerator vessel and thence through the regenerated catalyst standpipe prior to entry into the cat-cracker unit. Accordingly, it is contemplated that the presently contemplated procedure may involve a heat treatment time ranging from about 1 to 30 minutes.

The FMS catalyst slurry will preferably contain from about 5 to 30 percent by weight FMS blended with a suitable fluid such as water or water-liquid hydrocarbon. Suitable liquid hydrocarbon includes $C_5$—$C_{30}$ hydrocarbon. When mixtures of hydrocarbon and water are used up to 50 percent by weight hydrocarbon may be employed. Preferably hydrocarbon to water weight ratios of 1:10 to 1:1 may be effectively utilized. These mixtures may include suitable surface active agents or emulsifiers necessary to provide a reasonably stable and uniform mixture of ingredients.

The FMS catalyst utilized in the practice of the present invention is described as a rare earth hydrogen Y molecular sieve which is prepared by a procedure typically set forth in application Ser. No. 67,284, filed 8/16/70 by Scherzer et al. The RE-H-Y FMS catalyst is a particulate catalyst prepared in the form of microspheres having a size of from about 60 to 200 microns. The catalyst is prepared by first obtaining a tough attrition resistant sodium Y microsphere particle and thereafter converting the sodium Y particle into the rare earth-hydrogen form which possesses the desired catalytic activity.

Briefly, RE-H-Y FMS is prepared by contacting a suitable microsphere of sodium faujasite which possesses a silica to alumina ratio in excess of about 3 with a solution of rare earth ions at a pH of from about 3.0 to 3.5 to reduce the alkali metal oxide content of the faujasite to less than about 4 percent by weight. During this exchange from about 6 to 14 percent by weight rare earth ions calculated as $RE_2O_3$ is exchanged into the sodium zeolite microsphere. The exchanged faujasite is then calcined at a temperature of 800° to 1,400°F. for a period of about 1–3 hours. The calcined faujasite is then further exchanged with a solution of ammonium ion to reduce the alkali metal oxide content thereof to less than about 0.5 percent by weight.

The starting sodium faujasite utilized in the preparation of the presently contemplated fluidizable PCY and rare earth hydrogen Y catalyst components is a sodium faujasite which possesses a silica to alumina ratio in excess of about 3.0 and preferably in excess of about 3.2 up to about 6. The fluidized sodium Y particle will possess the attrition characteristics which are required for use in the fluidized cat-cracking of hydrocarbons. Suitable fluidizable sodium Y faujasite is prepared by way of procedures set forth in U. S. Pat. No. 3,472,617.

Typical procedures for preparing suitable attrition resistant microspheres of sodium faujasite having a particle size range of from about 60 to 200 microns involve contacting formed particles of clay and/or silica-alumina hydrogel with sodium hydroxide solution under hydrothermal reaction conditions to convert the clay or hydrogel to crystalline aluminosilicate (synthetic faujasite).

A particularly efficient method for converting amorphous silica-alumina hydrogel microspheres to sodium faujasite involves forming a mixture of sodium hydroxide, sodium aluminate, 13 percent alumina silica-alumina hydrogel cracking catalyst, water and a zeolite seed preparation, and then heating the mixture at about 100°C for 8 to 10 hours. The seed preparation comprises finely divided amorphous silica-alumina particles which are particularly active for promoting the formation of crystalline zeolites. The preparation and use of these seeds is fully set forth in U.S. Pat. No. 3,574,538 to McDaniel et al.

While the present procedure is particularly adapted for the heat treatment of catalysts used in the fluid cracking of petroleum, it is also contemplated that moving bed or pelleted type catalyst may also be treated by the procedure herein contemplated.

Having described the basic aspects of the present invention, the following specific example is given to illustrate a specific practice thereof.

EXAMPLE I

A fluidizable rare earth hydrogen Y was prepared by the following procedure:

1. A sample of fluidizable sodium faujasite was prepared from commercial 13% alumina amorphous silica alumina hydrogel catalyst as follows:

A 2786 g. sample of NaOH was dissolved in 4250 g. of $H_2O$ with stirring, then 272 g. of commercial $Al_2O_3$ was added and heated at reflux until the $Al_2O_3$ was dissolved. The resulting sodium aluminate solution was cooled to 20°C. A slurry containing 8,229 g. of commercial low alumina amorphous silica-alumina cracking catalyst having a particle size range of 50 to 200 microns containing 13 percent by weight alumina and 9,900 g. $H_2O$ was prepared. A zeolite seed solution was prepared by:

a. 101 g. of C—31 alumina ($Al_2O_3$) was dissolved in a solution containing 595 g. of NaOH in 1072 g. of $H_2O$:

b. then 1,200 g. of water was added to 2,040 g. of a sodium silicate solution containing 27.7 wt. % of $SiO_2$ and 8.60 wt. % $Na_2O$;

c. the two solutions were mixed by adding the silicate solution to the aluminate solution with rapid stirring;

d. after a 24 hour age at room temperature the seed preparation was ready for use.

The sodium aluminate solution, silica-alumina catalyst slurry and 3,790 ml. of seed preparation were mixed and heated for 8 to 10 hours at 100°C. The resulting sodium faujasite microsphere product was cooled to room temperature.

2. To convert the above prepared microspheroidal sodium faujasite to RE-H-Y FMS the following procedure was followed:

A rare earth chloride solution was prepared by diluting 40 ml. of 28.5% $RE_2O_3$ solution with 225 ml. of $H_2O$. A slurry containing 100 g. of the sodium faujasite microspheres prepared above and 250 ml. of $H_2O$ was prepared. The microsphere slurry was combined with the rare earth chloride solution with agitation, and the pH of the slurry was adjusted to 3.3 to 3.5 by addition of HCl. The mixture was heated to 140°–160°F. for 1 hour while maintaining the pH at 3.3 to 3.5 by adding HCl.

The rare earth exchanged microspheres were washed Cl⁻ free with water, then dried and calcined at 1,000°F. for 2 hours. The calcined zeolite product was exchanged with ammonium sulfate solution at 140° to 160°F. using a wt. ratio of zeolite:$(NH_4)_2SO_4$:$H_2O$ of 100:1,000:500.

The chemical and physical properties of the above prepared RE-H-Y FMS component is tabulated below:

| FMS | RE-H-Y |
|---|---|
| Si/Al Ratio | 5.4 |
| $RE_2O_3$ wt. % | 11.90 |
| $Na_2O$ wt% | 0.22 |
| Surface Area m²/g | 774 |

| | |
|---|---|
| Particle Size Mesh | 60–200 |

EXAMPLE II

A water-FMS slurry was prepared by combining 15 wt.% of the rare earth hydrogen Y FMS described in Example I. This slurry was placed in a pressurized container which was provided with agitation means. The pressurized container was connected to the regenerator system of a fluid cat-cracking unit in the manner set forth in the FIGURE of the drawing described above. The cat-cracking unit was operated at a conversion of 71 vol.%, a catalyst oil ratio of 5.4 and a catalyst contact time of 48 seconds. The temperature in the catalytic conversion zone was maintained at 925°F. whereas the temperature maintained in the regenerator vessel was maintained at a temperature of about 1210°F. The unit was first operated at a rate of 13,000 barrels per day using a catalyst which consisted essentially of amorphous silica-alumina catalyst which contained 25 percent alumina. The above described mixture of FMS and water was injected into the spent catalyst riser at a rate of about 70 pounds of mixture per hour. The catalytic activity for the unit was observed over a period of several weeks, whereupon it was found that the initial activity of the unit was increased from about 71 vol.% conversion to about 76 vol.% When the activity reached the upper level, the addition of the FMS/water slurry was reduced to a rate of about 60 pounds per hour. It was found that this reduced addition rate of catalyst would maintain the catalyst activity indefinitely.

The above description and examples clearly indicate that an improved novel method for the catalytic cracking of hydrocarbons is described herein.

I claim:

1. In an improved method for the catalytic cracking of hydrocarbons wherein a heated inventory of catalyst is contacted with hydrocarbons at elevated temperature in a cracking zone, and said catalyst is removed from said cracking zone for regeneration, the improvement which comprises adding a mixture of fluidizable molecular sieve catalyst and a liquid selected from the group consisting of water, and water-liquid hydrocarbon mixtures, to said heated inventory whereby said liquid is converted to hot gases and said fluidizable molecular sieve catalyst is heat treated within said inventory prior to being contacted with hydrocarbons in the cracking zone.

2. The method of claim 1 wherein said catalyst inventory is maintained at a temperature of from about 800° to 1,400°F.

3. The method of claim 1 wherein said fluidizable molecular sieve catalyst is rare earth hydrogen Y zeolite having a particle size of about 60 to 200 microns.

4. The method of claim 1 wherein said mixture is added to the regenerator vessel of a cat-cracking unit.

5. The method of claim 1 wherein said mixture is added to the spent catalyst riser of a cat-cracking unit.

6. The method of claim 1 wherein said mixture is added to the regenerated catalyst standpipe of a cat-cracking unit.

7. The method of claim 1 wherein said mixture contains from about 5 to 30% by weight fluidizable molecular sieve catalyst.

8. The method of claim 1 wherein said mixture is added to maintain a catalyst activity of at least 30 vol.% conversion within said cat-cracking unit.

9. The method of claim 1 wherein said liquid is water.

10. The method of claim 1 wherein said liquid is water-liquid hydrocarbon mixture contain a weight ratio of water to hydrocarbon of 1:1 to 10:1.

* * * * *